(12) United States Patent
Okuda (10) Patent No.: US 8,010,044 B2
(45) Date of Patent: Aug. 30, 2011

(54) RADIO TERMINAL, RELAY STATION, RADIO BASE STATION AND COMMUNICATION METHOD

(75) Inventor: Masato Okuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 810 days.

(21) Appl. No.: 11/819,991

(22) Filed: Jun. 29, 2007

(65) Prior Publication Data

US 2008/0045147 A1 Feb. 21, 2008

(30) Foreign Application Priority Data

Aug. 17, 2006 (JP) .................................. 2006-222448

(51) Int. Cl.
*H04B 7/14* (2006.01)
(52) U.S. Cl. ............ 455/15; 455/11.1; 455/13.1; 455/7; 455/67.16
(58) Field of Classification Search .................. 455/7, 9, 455/11.1, 424, 425, 67.11, 67.13, 552.1, 455/456.5, 456.6, 13.1, 560, 437, 439, 15, 455/16, 517, 522, 422.1, 500, 445; 370/252, 370/280, 329, 315
See application file for complete search history.

(56) References Cited

U.S. PATENT DOCUMENTS

| 7,463,673 | B2* | 12/2008 | Fujii et al. | 375/211 |
| 7,680,452 | B2* | 3/2010 | Oodachi et al. | 455/11.1 |
| 2003/0220079 | A1* | 11/2003 | Kikuma | 455/67.13 |
| 2004/0110524 | A1* | 6/2004 | Takano et al. | 455/522 |
| 2004/0192204 | A1 | 9/2004 | Periyalwar et al. | |
| 2004/0242154 | A1* | 12/2004 | Takeda et al. | 455/16 |
| 2004/0266338 | A1* | 12/2004 | Rowitch | 455/7 |
| 2006/0084475 | A1 | 4/2006 | Ohkubo et al. | |
| 2007/0054624 | A1* | 3/2007 | Kashiwagi | 455/67.13 |
| 2008/0285500 | A1* | 11/2008 | Zhang et al. | 370/315 |
| 2009/0061920 | A1* | 3/2009 | Horiuchi et al. | 455/522 |
| 2009/0303918 | A1* | 12/2009 | Ma et al. | 370/315 |

FOREIGN PATENT DOCUMENTS

| CN | 1547862 | 11/2004 |
| KR | 2004-18525 | 3/2004 |
| WO | 2005/055507 | 6/2005 |
| WO | 2005/064872 | 7/2005 |

OTHER PUBLICATIONS

Korean Intellectual Property Office Office Action for corresponding Korean Patent Application No. 10-2009-0047769, with a mailing date of Jun. 24, 2009, English translation attached.
IEEE Std 802.16 TM-2004; Dated Oct. 1, 2004.
IEEE Std 802.16e TM-2005; Dated Feb. 28, 2006.

* cited by examiner

*Primary Examiner* — Tan Trinh
(74) *Attorney, Agent, or Firm* — Myers Wolin, LLC.

(57) ABSTRACT

The present invention utilizes a communication method including acquiring, with a radio base station, reception quality of the received signal received via no relay station from a radio base station measured with a radio terminal and reception quality received via a relay station from the radio base station and selecting the route for the radio terminal on the basis of both reception qualities acquired. Moreover, the present invention utilizes a relay station including a receiving unit for received signal in the transmission timing for transmission from the radio terminal notified from the radio base station, a measuring unit for measuring reception quality of the received signal obtained by the reception, and a transmitting unit for transmitting the result of measurement to the radio base station.

5 Claims, 9 Drawing Sheets

ROUTE SELECTION FLOW

RADIO TERMINAL, RELAY STATION, RADIO BASE STATION AND COMMUNICATION METHOD

CROSS REFERENCE TO RELATED APPLICATION

This application is related to and claims priority to Japanese Application No. 2006-222448 filed Aug. 17, 2006 in the Japanese Patent Office, the contents of which are incorporated by reference herein.

BACKGROUND OF THE INVENTION

1. Field of the Invention

The present invention relates to a radio terminal, a relay station, a radio base station, and a communication method among these stations. The present invention is particularly suitable for use on the occasion of addition of a relay station on the basis of a radio communication system specified, for example, by IEEE802.16.

2. Description of the Related Art

A radio communication system to realize communication via a radio communication path is now spreading in the world-wide scale as a representative system of the WCDMA and CDMA 2000 or the like. In this radio communication system, a plurality of radio base stations are provided for service areas and a radio terminal makes communication with the other communication devices (communication terminals) via any of the radio base stations. Moreover, in such system, a service area formed by a base station is overlapped with another service area formed by an adjacent base station. Therefore the communication can be maintained by a handover process even though radio environment of the communication gets worse.

Moreover, as a radio communication system, the technologies, for example, code division multiplex, time division multiplex, frequency multiplex and OFDM (OFDMA) are generally employed and thereby a plurality of radio terminals can be connected to a radio base station simultaneously.

However, when a radio terminal is close to the boundary of a service area formed by a base station even within the service area, high-speed communication becomes difficult for the radio terminal because the radio communication environment is deteriorated.

Therefore, a communication system has been proposed, in which a relay station is provided within the service area of a radio base station to realize radio communications between a radio terminal and the radio base station via the relay station.

Particularly, introduction of such relay station (RS) is now discussed by the task group of 802.16j.

Matters regarding IEEE802.16 are disclosed, for example, in the IEEE Std802.16TM-2004 and the IEEE Std802.16eTM-2005.

SUMMARY OF THE INVENTION

According to the background of the invention explained above, a radio terminal is capable of conducting radio communication with a radio base station directly or via a relay station. However, it must be discussed for a radio terminal how effectively uses a relay station.

Accordingly, it is an object of the present invention to provide a system and a sequence to effectively use the relay station.

Moreover, it is also another object of the present invention to realize, in the case where a relay station is newly employed, route selection control and route changing control between the communication route via a relay station and the direct communication route without any particular communication with the relay station by controlling a radio terminal to recognize installation of a new relay station.

Moreover, it is also another object of the present invention to obtain any advantage lead from any of the following embodiments but cannot be obtained by prior art.

The present invention utilizes a radio terminal comprising a measuring unit measuring reception quality by receiving a radio signal from a relay station in a measurement timing instructed from a radio base station and a transmitting unit transmitting said reception quality to be received by said radio base station.

The present invention utilizes a radio base station comprising a transmitting unit transmitting a signal to instruct measurement timing of reception quality to a radio terminal and a determining unit determining whether a radio signal should be transmitted to a radio terminal directly rather than via a relay station or via a relay station on the basis of the reception quality measured by said radio terminal with respect to a radio signal transmitted to said radio terminal from said relay station in said measurement timing.

The present invention utilizes a relay station comprising a receiving unit acquiring a measurement timing at which a radio terminal measures reception quality of a radio signal and a transmitting unit transmitting in said measurement timing a radio signal with which said radio terminal is capable of measuring reception quality.

The present invention utilizes a communication method comprising acquiring, by a radio base station, reception quality of a received signal received directly rather than via a relay station from said radio base station and reception quality of a received signal received via a relay station from said radio base station measured by a radio terminal and selecting a route for said radio terminal based on said both reception qualities obtained.

The present invention utilizes a relay station comprising a receiving unit executing reception procedure in a transmission timing notified by a radio base station wherein a radio terminal transmits a signal in the transmission timing, a measuring unit measuring reception quality of the signal transmitted from the radio terminal and a transmitting unit transmitting said reception quality to said radio base station.

Preferably said transmitting unit further transmits deviation of reception timing or receiving frequency detected by said receiving unit to said radio base station.

The present invention utilizes a radio base station comprising a transmitting unit transmitting data to control transmission timing to a radio terminal, a quality measuring unit obtaining a first reception quality information by receiving, without via a relay station, a signal transmitted in accordance with said control data from said radio terminal and measuring quality of said received signal, a receiving unit obtaining a second reception quality information by receiving reception quality information of said signal from a relay station which receives said signal and a determining unit selecting a communication route of said radio terminal based on said first reception quality information and said second reception quality information.

Preferably said receiving unit receives deviation of reception timing or receiving frequency detected by reception of said signal by said relay station and said transmitting unit transmits said deviation of reception timing or receiving frequency to said radio terminal.

The present invention utilizes a communication method comprising receiving a signal from a radio terminal without via a relay station, measuring receiving quality of said signal, and obtaining a first reception quality information, obtaining a second reception quality information by receiving reception quality information of said signal from a relay station which receives said signal and selecting a communication route of said radio terminal based on said first reception quality information and said second reception quality information.

DETAILED DESCRIPTION OF THE PREFERRED EMBODIMENTS

The preferred embodiment of the present invention will be explained with reference to the accompanying drawings.

[a] First Embodiment

A radio terminal is required to set up synchronization with a radio base station to receive radio signals from the radio base station. Therefore, each radio base station transmits a signal for synchronization within the service area of the own station. For example, as the signal for synchronization (synchronization signal), a preamble signal which is different in each radio base station may be used. A radio terminal previously stores patterns of a plurality of preamble signals and is capable of selecting a radio base station as a communication partner by selecting the highest reception quality (for example, the receiving level) of the patterns.

For example, when the OFDM is used as the radio system, a radio base station executes transmission using a plurality of sub-carriers by assigning the transmitting data to each sub-carrier. In such case, the radio base station can transmit the preamble by assigning the preamble to each sub-carrier in the predetermined patterns. Then the radio terminal synchronizes with a radio base station from which the radio terminal receives a preamble with the highest quality (the best matching condition).

In addition, the radio base station transmits a signal in a frame format with reference to the synchronization signal. A radio terminal establishes frame synchronization by utilizing the synchronization signal and receives mapping (radio frame format) information (data to control transmitting or receiving operation of the radio terminal: MAP data) of the data with reference to the synchronization signal. For example, the MAP data is allocated right after the synchronization signal.

Timing, channel information, modulation scheme, coding method, and coding rate or the like for mapping data to a physical channel (downlink channel (channel to the radio terminal side from a radio base station)) and uplink channel (channel to the radio base station side from the radio terminal side) can be included to the MAP data and the radio frame has a format corresponding to the MAP data. Moreover, the physical channel can be designated for each radio terminal by using the identifying information of terminal. Of course, it is also possible to transmit the mapping information to a plurality of radio terminals (for example, all radio terminals within the service area formed by one radio base station) for transmission and reception of a predetermined signal without particular designation of a radio terminal.

Accordingly, combination of data, which includes parameters required for reception (transmission) of the reception (transmission) timing and receiving (transmitting) channel (reception (transmission) sub-channel pattern information) or the like, and a terminal ID for such reception (transmission) can be used as an example of the MAP data.

A radio terminal receives radio signals with the reception timing and receiving channel designated by the MAP data and transmits radio signals with the transmission timing and transmitting channel designated by the MAP data. Accordingly, direct radio communication (without via a relay station) with the radio base station can be realized.

Meanwhile, a relay station similarly receives the synchronization signal from the radio base station to establish synchronization. Moreover, the relay station receives the MAP data with reference to the synchronization signal and transmits transmitting data to a radio terminal in accordance with the parameter required for transmission such as transmission timing and transmitting channel (transmitting sub-channel pattern information) or the like designated by the MAP data. The transmitting data to the radio terminal can be obtained by using a communication link (MMR link) between the radio base station and the relay station. Here, the relay station can previously acquire the parameter such as transmission timing and channel or the like designated by the MAP data by using the MMR link.

Namely, the relay station receives radio signals to the own station with the reception timing and receiving channel designated by the MAP data and transmits radio signals to be transmitted from the own station with the transmission timing and transmitting channel designated by the MAP data or by the MMR link. The MMR link is the communication between the radio base station and the relay station and the radio terminal is not required to receive signals transmitted via the MMR link.

Moreover, the relay station does not re-transmit the MAP data to the radio terminal. The assumed reason is that the MAP data is considered to be reduced in quantity of information for the ordinary transmitting data (user data) to allow repetitive transmissions and to be sent more easily to the radio terminal to the transmitting data than that with transmission in higher transmitting power or in lower transmitting rate only in such quantity.

A radio terminal receives the MAP data directly from a radio base station and also receives radio signals re-transmitted from the relay station in accordance with such MAP data.

Therefore, the radio terminal is capable of receiving data directly from the radio base station and is also capable of receiving, from the relay station, the data, which is received once by the relay station, from the radio base station.

Here, the radio terminal conducts reception and transmission in accordance with the MAP data transmitted from the radio base station and is not required to recognize transmission and reception of data via the relay station.

As explained above, a plurality of candidates of the transmitting and receiving paths for the radio terminal can be attained by utilizing the relay station and therefore radio communications of radio terminals in the area near the boundary of the service area of the radio base station can be supported.

Here, it is desirable that the relay station does not re-transmit the synchronization signal periodically transmitted from the radio base station. Namely, if the relay station retransmits the synchronization signal, it is considered to occur that the radio terminal is synchronized with the relay station by receiving the synchronization signal from the relay station and cannot detect MAP dada if it searches the MAP data with reference to the received synchronization signal. Moreover, it is also required to recognize existence of the other stations different from the radio base station.

Next, how the radio terminal should use a relay station will be explained below.

A radio terminal can select a radio base station to obtain excellent reception quality among a plurality of the radio base stations by utilizing the synchronization signal (for example, preamble signal, pilot signal or the like) transmitted from each radio base station.

However, in case where the relay station receives the synchronization signal (for example, preamble) transmitted periodically from the radio base station but does not re-transmit the synchronization signal (preamble) the radio terminal can not select a preferred station among the relay station and the base station.

Therefore, in this embodiment, the radio terminal acquires a timing in which the relay station transmits radio signals on the basis of the data (MAP data, control data) transmitted from the radio base station and measures the reception quality of radio signals from the relay station in accordance with the timing acquired.

Detail structure and operation of each unit will be explained below with reference to the accompanying drawings.

Figure 1:
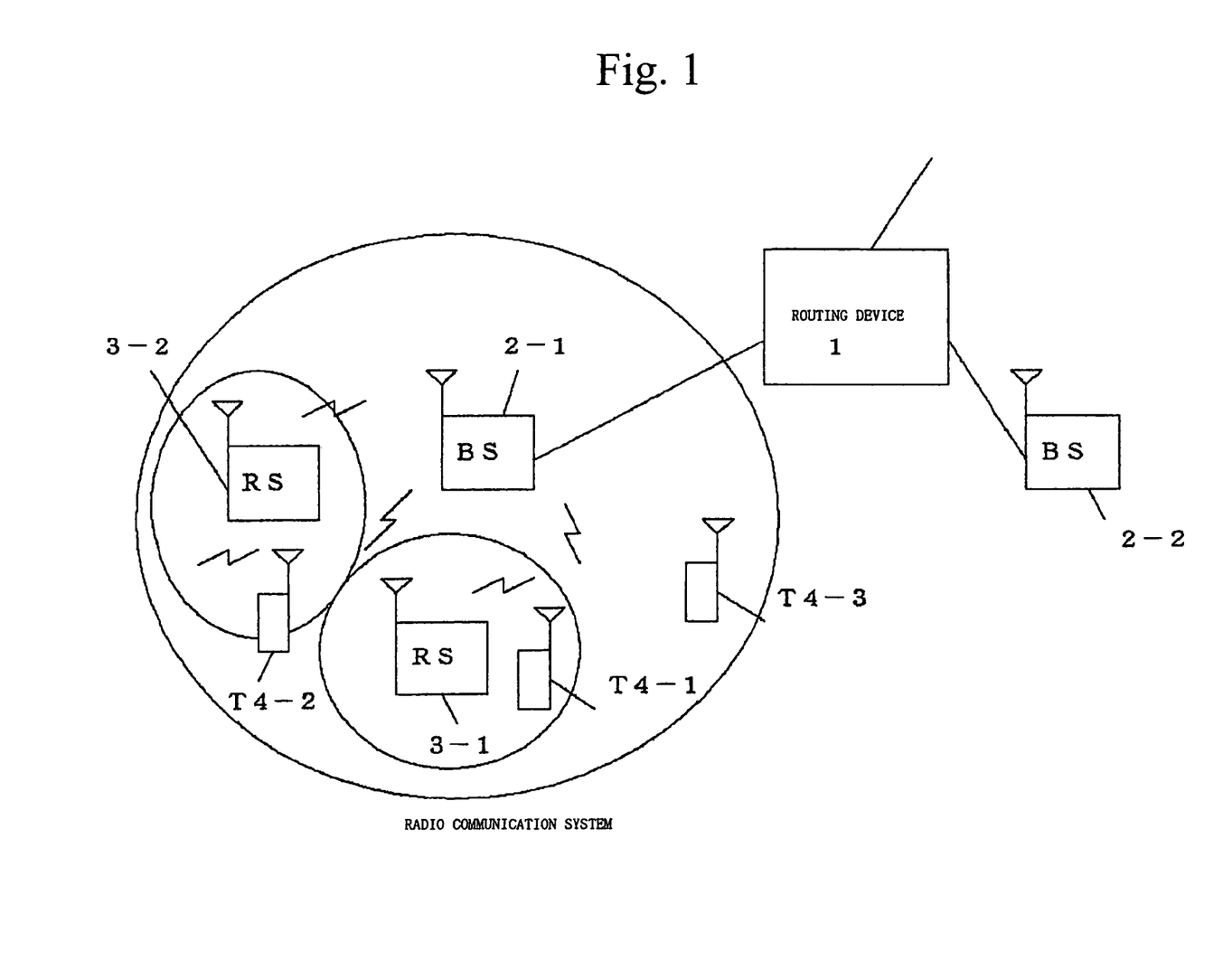
FIG. 1 is an exemplary illustration of a radio communication system.

FIG. 1 shows a structure of a radio communication system of a first embodiment. In FIG. 1, numeral 1 denotes a routing device; 2, a radio base station (BS); 3, a relay station (RS); and 4, a radio terminal (T), respectively. As the radio terminal 4, a so-called MS (Mobile Station) suitable for movement or a radio device suitable for stationary use may be used.

Here, the radio terminal 4 can realize radio communication directly (without relay station) with the radio base station 2 within the service area of the radio base station 2 and can also realize radio communication via the relay station 3 within the service area of the relay station 3. One or more relay stations 3 may be provided within the service area of the radio base station 2 for radio communication with the radio terminal 4.

The radio base station 2 is connected to the routing device 1. The radio base station receives data from the radio terminal 4 and transmits the data to the routing device 1 and also executes control of transmission of data received from the routing device 1 to the radio terminal 4. The routing device 1 is connected to a plurality of radio base stations for conducting routing to achieve delivery of data to a destination by transmitting the data received from the radio base station 2 to the other routing device or another radio base station. Preferably, the radio base station 2 transfers the data to the routing device after conversion to a packet format. Here, it is desirable for allowing the routing device to access to a database storing location registration areas of radio terminals (information in which area the radio terminal exists among areas formed by a plurality of radio base stations) and information indicating a type of a service for each radio terminal or the like. The routing device 1 can acquire such data from this database as required at the time of routing process.

Next, a structure of the radio base station 2 will be explained in more detail with reference to FIG. 2.

Figure 2:
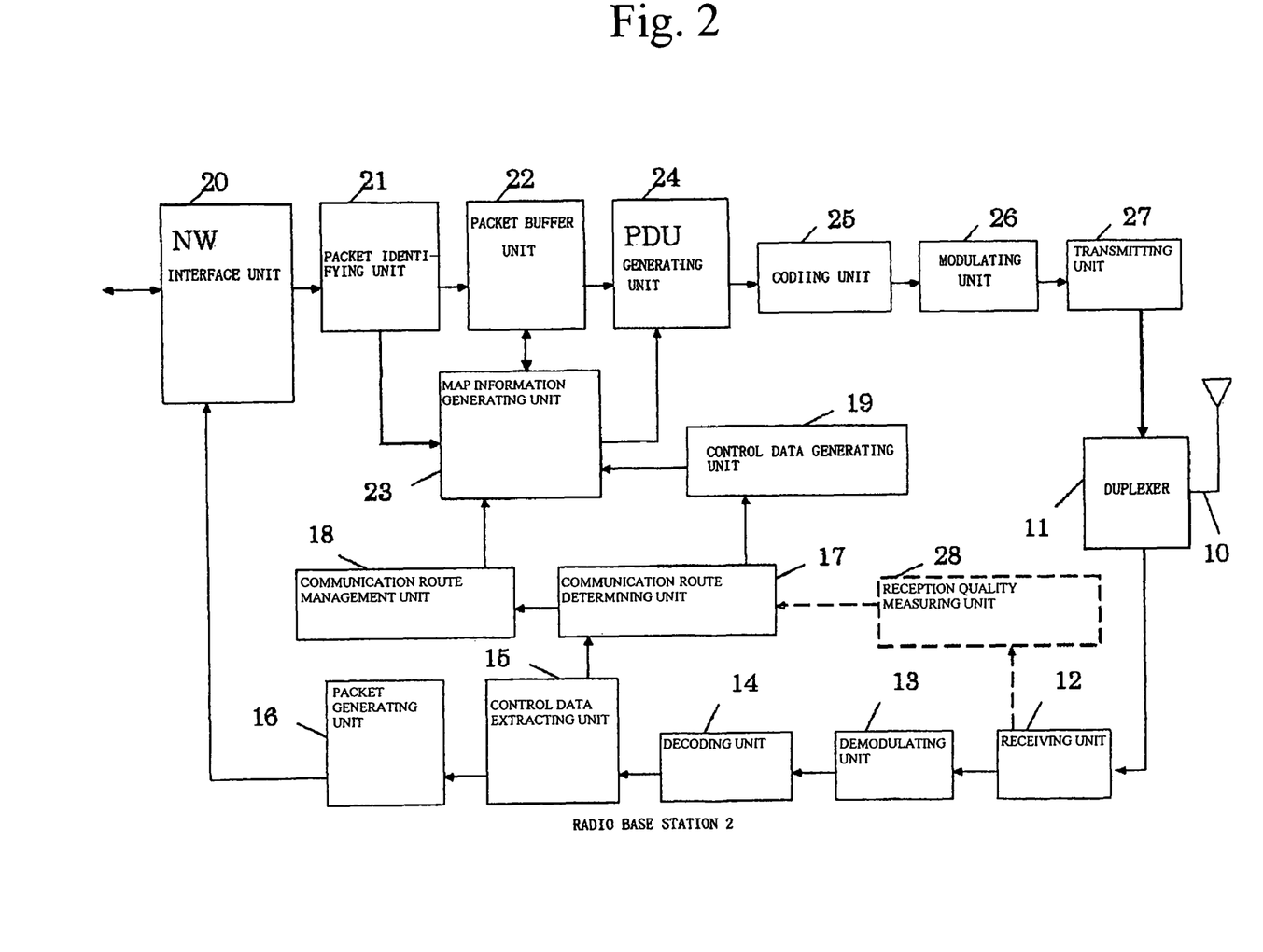
FIG. 2 is an exemplary illustration of a radio base station 2.

FIG. 2 is a diagram showing a structure of the radio base station 2.

In FIG. 2, numeral 10 denotes an antenna for transmitting and receiving radio signal with the relay station 3 and radio terminal 4; 11, a duplexer using in common the antenna 10 in the transmitting and receiving systems; 12, a receiving unit; 13, a demodulating unit for demodulating the received signal; 14, a decoding unit for decoding the demodulated received signal; 15, a control data extracting unit for extracting control data from the decoded data to transfer the control data to a communication route determining unit 17 and to transfer the other data such as user data to a packet generating unit 16; 16, the packet generating unit for transferring the data from the control data extracting unit to a NW interface unit as the packet data.

Numeral 17 denotes a communication route determining unit which selects a preferable communication route for the radio terminal 4 among a direct communication route not including the relay station 3 in the communication route and a communication route including the relay station 3 in the communication route on the basis of the extracted control data. Numeral 18 denotes a communication route management unit for administrating and storing the determined communication route for each radio terminal.

Numeral 19 denotes a control data generating unit for generating a measurement control data for controlling the radio terminal 4 to execute measurement of reception quality in accordance with control of the communication route determining unit 17 and applying the data to a MAP information generating unit 23. In this case, the measurement control data may include the identifying information of the radio terminal 4, reception quality measurement timing and channel information.

Numeral 20 denotes an interface unit to form an interface (here, packet communication is realized) to a routing device 1; 21, a packet identifying unit for discriminating a IP address included in the packet data received from the NW interface unit 20, determining the radio terminal as the communication partner based on the IP address data, acquiring the QOS corresponding to the ID, issuing request for band assignment by giving the ID, QOS information to a MAP information generating unit 23, and storing packet data transferred from the NW interface unit 20 to a packet buffer unit 22. The ID of the radio terminal 4 is exemplary obtained by referring a storing unit which stores relation between the IP address and the ID of the radio terminal 4. Preferably the correlation information also includes relation between QOS and the ID of the radio terminal 4 for above. For example, an IP address, QOS and the ID of the radio terminal 4 are stored as a record.

Numeral 23 denotes a MAP information generating unit for identifying a communication route by referring a communication route management table 18 with the ID of the radio terminal 4 as a key upon reception of the band assignment request, determining a mapping area in accordance with the QOS, and instructing a PDU generating unit 24 to form a frame format in accordance with the mapping area. In this case, the data to be transmitted is read from the packet buffer unit 22 and is then transferred to the PDU generating unit 24 together with the MAP data. Since a communication link (MMR link) is also provided between the radio base station 2 and the relay station 3, it is also possible that the identifying information of the relay station 3, transmission and reception timings and channel are included in the MAP data and transmission data is transmitted to the relay station in the corresponding timing with the corresponding channel.

Moreover, the MAP information generating unit 23 acquires, when it receives a measurement control data from the control data generating unit 19, the transmission timing and channel required for transmission of the measurement control data, generates MAP data indicating the transmission timing and channel acquired and transfers this MAP data to a PDU generating unit 24 together with the measurement control data in order to transmit the measurement control data. Thereafter, the MAP information generating unit 23 controls the PDU generating unit 24 to transmit radio signals from the radio base station 2 or relay station 3 in the measurement timing and channel designated by the measurement control data. In the case where the radio signals (for example, preamble) are transmitted periodically from the radio base station 2 as the measurement object, the radio base station 2 is not required to transmit the new radio signal only for measurement of the reception quality with respect to the radio base station 2.

However, for the relay station 3, it is required to transmit radio signals at least within the measurement period thereof. Therefore, the MAP information generating unit 23 includes the measurement timing and channel information designated by the measurement control data for the radio terminal 4 to the MAP data and controls the MMR link to transmit signals to the relay station 3, wherein the signals are transmitted from the relay station 3 in the service area of the relay station 3 within the measuring period. As the signals to be transmitted within the measuring period, a pilot signal, for example, may be considered but the radio base station 2 can also transmit user data which is available for purposes other than measurement of reception quality is with the pilot signal. The signals transmitted in the measuring period may be selected from signals transmitted to a particular radio terminal (for example, T4-1) in the service area, signals transmitted to the radio terminal which is different from that which is the object of the measurement, and signals transmitted in general to radio terminals within the service area in place of the particular radio terminal.

Numeral 24 denotes the PDU generating unit for generating the PDU data to store the MAP data and transmitting data (including the measurement control data) or the like to each region of the radio frame formed with reference to the synchronization signal (preamble) and for transmitting the same PDU data to a coding unit 25. Numeral 25 denotes the coding unit; 26, a modulating unit; 27, a transmitting unit respectively. The PDU data is sequentially subjected to the coding process such as the error-correction coding or the like and is then modulated and finally transmitted as radio signals from a transmitting unit 27 via the antenna 10.

Figure 3:
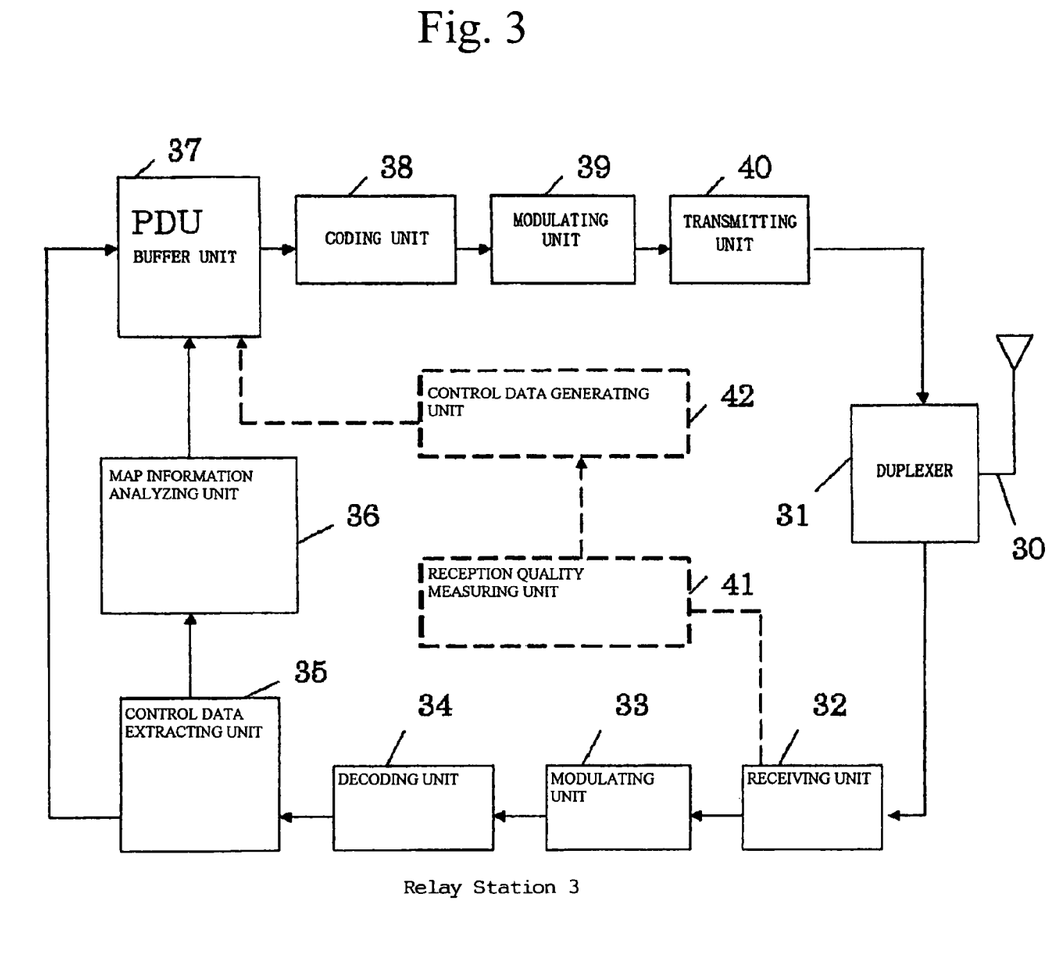
FIG. 3 is an exemplary illustration of a relay station 3.

FIG. 3 is a diagram showing a structure of the relay station 3.

In FIG. 3, numeral 30 denotes an antenna for transmitting and receiving radio signals with the radio base station 2 and the radio terminal 4; 31, a duplexer for using in common the antenna 10 for transmission and reception; 32, a receiving unit; 33, a demodulating unit for demodulating the received signals; 34, a decoding unit for decoding the demodulated received signals; 35, a control data extracting unit 35 for extracting the MAP data (received from the radio base station 2) from the decoded data and giving the MAP data to the MAP information analyzing unit 36 and for transferring the data to the radio terminal 4 received from the radio base station 2 to a PDU buffer unit 37. In the case where the radio signals are received from the radio terminal 4, the receiving data is also transferred to the PDU buffer unit 37 for transmission to the radio base station 2.

Numeral 37 denotes the PDU buffer unit for controlling the coding unit 38 and the modulating unit 39 to transmit data addressed to the radio terminal 4 wherein the data is received from the radio base station 2 in accordance with the transmission timing and channel notified from the radio base station 2 on the basis of the MAP data analyzed by the MAP information analyzing unit 36 or the data received via the MMR link. Data addressed to the radio terminal 4 and the measurement control data are received via the communication link (MMR link) formed between the radio base station 2 and relay station 3. Since the identifying information of the relay station 3, transmission timing and channel information is included in the MAP data transmitted from the radio base station 2, the relay station 3 can receive data from the radio base station 2 by performing reception procedure with the designated timing and channel (the uplink direction is also defined with the MAP data).

Numeral 38 denotes a coding unit and 39, a modulating unit, respectively. The transmitting data and the measurement control data from the PDU buffer unit 37 are coded and are then transferred to a transmitting unit 40 after the modulation process for transmission of the user data and measurement control data in the transmission timing with the channel acquired by the MAP information analyzing unit.

Numeral 40 denotes a transmitting unit for transmitting signals as radio signals to the radio terminal 4 and radio base station 2 via the antenna 30.

Figure 4:
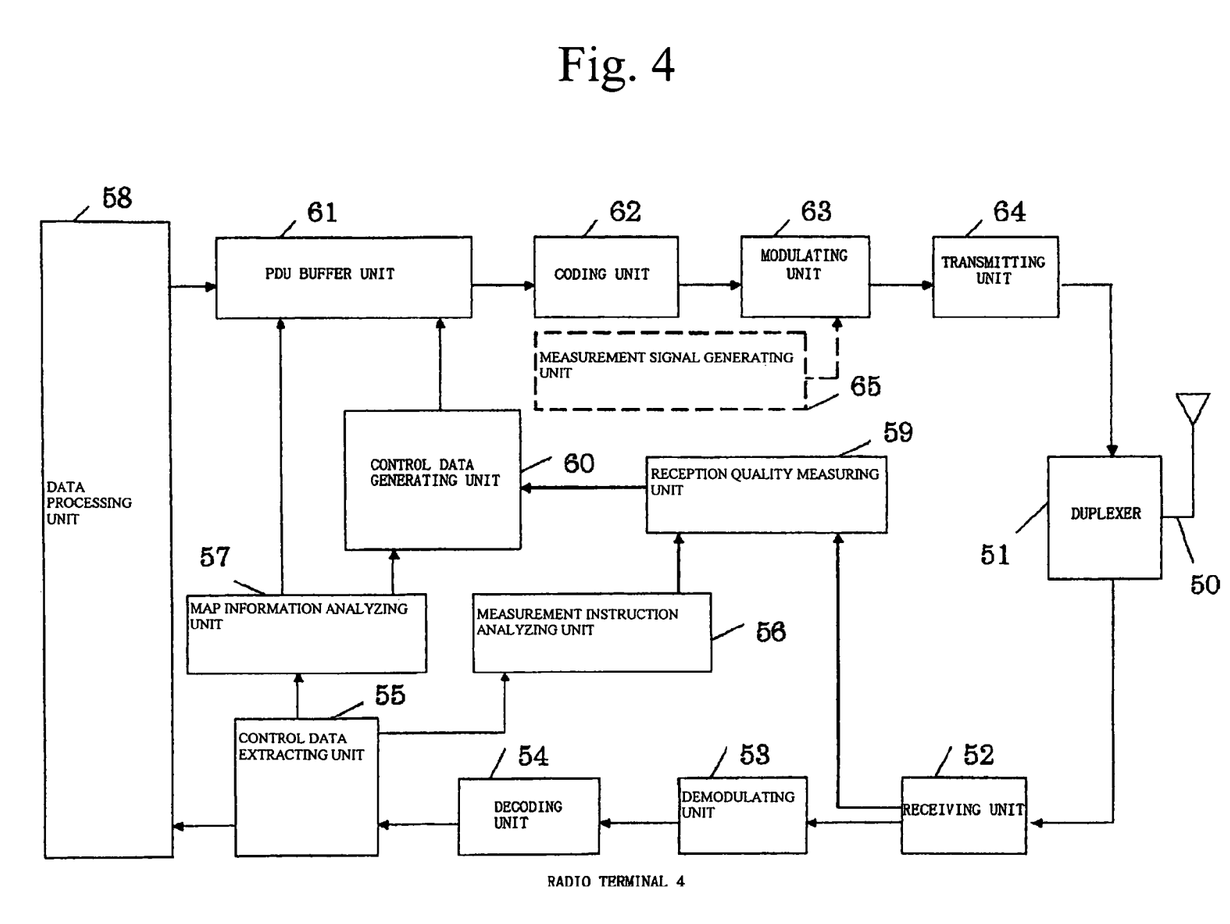
FIG. 4 is an exemplary illustration of a radio terminal 4.

FIG. 4 is a diagram showing a structure of the radio terminal 4.

In this FIG. 4, numeral 50 denotes an antenna for transmitting and receiving radio signals with the relay station 3 and the radio base station; 51, a duplexer for using in common the antenna 50 for transmission and reception; 52, a receiving unit; 53, a demodulating unit for demodulating the receiving radio signals; 54, a decoding unit for decoding the demodulated received signals; 55, a control data extracting unit for extracting the control data from the decoding data, applying the control data, when it is the measurement control data, to a measurement instruction analyzing unit 56, applying the control data, when it is the MAP data to a MAP information analyzing unit 57 and transferring the other data (user data) to a data processing unit 58; and 58, the data processing unit for displaying of various data and processing audio outputs of these data included in the receiving data.

Moreover, user data which is desired to be transmitted to another device as a destination is inputted to a PDU buffer unit 61 from the data processing unit 58.

Numeral 59 denotes a reception quality measuring unit for measuring reception quality of a measuring channel at a measurement timing wherein the measuring channel and the measurement timing are obtained as a result of analysis by the measurement instruction analyzing unit 56. For example, this unit measures CINR (carrier to interference and noise ratio) of the signal received by the receiving unit 52 and transfers the measured CINR to a control data generating unit 60. The reception quality measuring unit 59 measures reception quality not only of the received signal from the relay station 3 but also of the signal received directly from the radio base station 2. For example, the synchronization signal (preamble) part can be measured or the other part can also be measured. In any case, instruction for the measurement timing or the like can be received by the measurement control data.

The control data generating unit 60 acquires measured reception quality information (reception quality with respect to the radio base station and relay station 3) and then applies this measured reception quality information to a PDU buffer unit 61 as control data.

Numeral 61 denotes a PDU buffer unit for controlling a coding unit 62 and a modulating unit 63 in order to transmit the transmitting data from the data processing unit 58 and the reception quality information from the control data generating unit 60 in the transmission timing with transmitting channel designated by the MAP data.

Numeral 62 denotes a coding unit; and 63, a modulating unit. These units conduct coding and modulating processes for the transmitting data from the PDU buffer unit 61 to transmit in the transmission timing with the transmitting channel designated by the MAP information.

A transmitting unit 64 transmits radio signals via the antenna 50.

Next, an example of a radio frame format will be presented and a communication sequence in the system explained above will be explained in detail. Here, the radio frame format conforming to the IEEE Std802.16d, e will be considered as an example but the present embodiment is not limited thereto.

Figure 5:
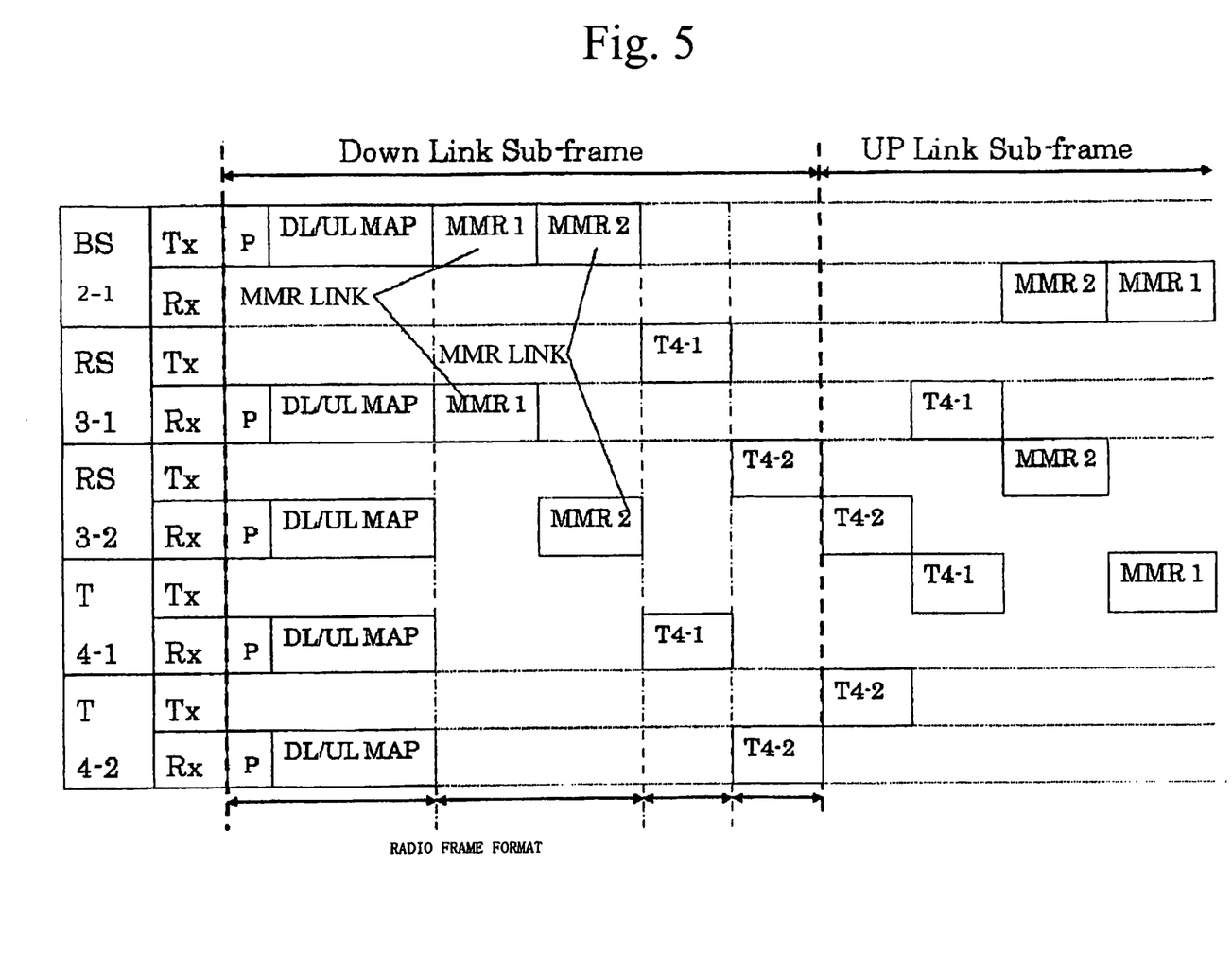
FIG. 5 is an exemplary illustration of a radio frame format.

FIG. 5 shows an example of a frame format of radio signals transmitted and received among the radio base station, relay station, and radio terminal. BS2-1, RS3-1, RS3-1, T4-1, and T4-2 are in the relationship of allocation shown in FIG. 1.

In FIG. 5, Tx, Rx respectively indicate transmission and reception. Therefore, BS2 transmits first the preamble (P) as the leading frame, followed by sequential transmissions of DL/UL MAP, MMR1, and MMR2. The preamble is formed in the known pattern to be transmitted for enabling synchronization of the radio terminal 4 and relay station 3 with the radio base station 2. When the OFDM (OFDMA) is used, the signal of the predetermined pattern is transmitted via each sub-channel.

Transmission of the preamble is followed by DL/UL MAP which is the region to store the control data (MAP data) for sending the transmission/reception timings and transmitting/receiving channels to the relay station 3 and radio terminal 4. For example, in this region, the transmission timing and transmitting channel information of MMR1, MMR2 transmitted as the MMR link to the relay station with the downlink channel from the radio base station, the timing and transmitting channel information for data transmission (T4-1, T4-2) to the radio terminals 4-1, 4-2, and the information indicating with which timing and channel the data (MMR1, MMR2, T4-1, T4-2) should be transmitting via the uplink channel are included as the MAP data (information indicating how the mapping should be made for transmission and reception).

Accordingly, each relay station 3 and radio terminal 4 are synchronized with the frame timing of the radio base station 2 by receiving directly the preamble P from the radio base station 2, receives the DL/UL MAP with reference to this synchronization, and executes transmission and reception of data in the corresponding timing and channel by detecting the timing and channel for transmission and reception by analyzing the MAP.

Therefore, the relay station RS3-1 receives, from the radio base station 2, data to be transmitted to the radio terminal 4-1 with transmission of T4-1 by analyzing the DL/UL MAP and receiving the MMR1 including a message to the own station. Similarly, RS3-1 also transmits data received with the MMR1 in the timing of T4-1 by detecting that the transmission timing of data to the radio terminal 4-1 designated by the DL/UL MAP is T4-1 in the figure.

Meanwhile, since the radio terminal 4-1 is synchronized with the radio base station 2 with the preamble transmitted from the radio base station 2 and analyzes the DL/UL MAP to recognize that the data is transmitted in the timing (T4-1) and channel designated thereby, this radio terminal 4-1 operates to receive such data.

Accordingly, the radio terminal 4 can receive the data without recognition of the data transmitting source (without discrimination of the radio base station 2 and the relay station 3).

In this frame format example, the period in which transmission is conducted to RS, T from BS2, the period (MMR period) in which transmission is conducted to RS from BS2, period in which transmission is conducted to T from RS3-1, and the period in which transmission is conducted to T from RS3-2 are separated on the time axis. Moreover, the uplink direction is separated in time from the downlink direction and respective transmitting periods of T and RS are also separated in time. Namely, transmission and reception in each section are separated with time division system (the same frequency band may be used), and the other separating method such as frequency separation method can also be employed.

Next, route selection control when such frame format is used will be explained below.

First, the radio terminal 4 executes network entry upon turning ON the power supply. Namely, it recognizes the radio base station 2 by receiving the preamble transmitted from the radio base station 2 and makes communication with the radio base station 2 (starts the process by transmitting the ranging signal (ranging code, ranging request) generated by the control data generating unit 60, for example, in the RNG of FIG. 7).

Moreover, the radio terminal 4 registers the own station to the radio base station 2 as a radio terminal which is provided services by the radio base station 2 and registers capability information of the radio terminal 4 to the radio base station 2. These registrations are executed by storing corresponding data in a storage area of the communication route management unit 18 with the radio terminal ID like the other data.

In this case, the radio terminal 4 possibly executes network entry to the radio base station 2 via the relay station 3. Namely, the radio terminal 4-1 transmits, in the uplink transmitting period, the ranging signal. However, if the ranging signal is not received by the radio base station 2, the relay station 3-1 which receives the ranging signal is capable of transmitting the ranging signal to the radio base station 2 with the MMR1. Since the MAP information analyzing unit 36 of the relay station 3 detects the transmission timing of RNG from the radio terminal T4-1 by receiving the MAP data from the radio base station 2, the ranging signal, which is received through control of the receiving system such as the receiving unit 32 or the like in order to receive such MAP data, can be transferred to the radio base station 2 by applying the ranging signal to the PDU buffer unit 37.

The communication route management unit 18 of the radio base station 2 sets and registers, upon direct reception of the ranging signal with the receiving unit 12 from the radio terminal 4, the communication route as "direct communication (without via a relay device)" corresponding to the ID of the radio terminal 4. Meanwhile, when the ranging signal is received (relay station 3-1, in this case) via the MMR link (communication link via the relay station), the communication route is set and registered as the "communication via the relay station 3-1". The radio base station 2 can easily determine the direct reception or the reception via a relay station 3 from the reception timing on the basis of the MAP data transmitted. Of course, such determination can also be made from the ID included in the data.

Upon completion of network entry, the radio base station 2 recognizes the radio terminal 4 (4-1) as the object terminal of communication under the control thereof. Therefore, it determines whether the present state (communication route) is preferable or not. Namely, the radio base station 2 controls the communication route determining unit 17 to execute the communication route selecting process.

First, the communication route determining unit 17 notifies to the control data generating unit 19 to generate the measurement control data for the radio terminal 4 having completed network entry. In this case, at first the communication route determining unit 17 measures reception quality of the direct communication route between the radio base station 2 and radio terminal 4 and next measures reception quality of the communication route between the base station 2 and the radio terminal 4 via the relay station 3. This sequence may also be inverted and the communication route which is already set and registered in the communication route management unit 18 can also be set as the first reception quality measuring object. Moreover, when a plurality of relay stations 3 are provided, each reception quality via respective relay stations can be measured sequentially. In this case, it is enough when the measurement control data is generated and transmitted for several times corresponding to each relay station 3. The identifying information of the relay station 3 under the control of the radio base station 2 (within the service area) is administrated and stored in the communication route determining unit 17.

In this case, first, in view of measuring reception quality of the direct communication route between the radio base station 2 and the radio terminal 4-1, the control data generating unit 19 controls the MAP information generating unit 23 to transmit from the radio base station 2 the measurement control data designating the period of transmitting any radio signals as the measuring period. Therefore, the MAP information generating unit 23 controls the MAP data to include transmission timing of the measurement control data, channel information, and identifying information of the radio terminal 4-1 and conducts control to transmit the measurement control data (A) in the transmission timing and channel.

However, when transmission via the relay station 3-1 is set and registered in the communication route management unit 18, it is also possible that the measurement control data is transmitted to the relay station 3-1 from the radio base station 2 with the MMR 1 link and the measurement control data is transmitted to the radio terminal 4-1 from the relay station 3-1 through the transmission timing and channel designated with the MAP data.

The radio terminal 4-1 analyzes the measurement control data with the measurement instruction analyzing unit 56 and measures reception quality of the received signal from the radio base station 2 for the measurement timing instructed by the measuring data with the reception quality measuring unit 59. Note that any radio signals are transmitted from the base station 2 to enable the measurement of the received signals at the measurement timing. The measurement timing and channel may also be notified again to the radio terminal 4-1 with the MAP data.

The radio terminal 4-1 transfers the measured reception quality information to the control data generating unit 60 and transmits the information in the transmission timing and channel designated by the MAP data (or measurement control data).

The radio base station 2 acquires the measured reception quality information (reception quality 1) directly or via the relay station 3-1 and transfers the information to the communication route determining unit 17.

Next, the control data generating unit 19 of the radio base station 2 generates the measurement control data (B) to measure reception quality of the communication route to the radio terminal via the relay station 3-1 and then transmits the measurement control data to the radio terminal 4-1. Here, it is possible that both measurement control data (A) and (B) are included in one measurement control data. In this case, the number of times of transmission of the measurement control data can be reduced.

However, in any way, the relay station 3-1 is requested to transmit radio signals in the measurement timing. Therefore, for example, the control data extracting unit 35 recognizes necessity of measurement when the relay station 3-1 receives the measurement control data and controls the PDU buffer unit 37 to transmit a known signal such as a pilot signal in the measurement timing. Here, the signal to be transmitted may be generated in the relay station 3 (generated by the control data generating unit 42 in accordance with detection of the measurement control data by the control data extracting unit 35) or may be received from the radio base station 2 via the MMR link.

Otherwise, transmission of signals to the radio terminal (4-1 or 4-2 or general radio terminals without specifying a specific a terminal) in a service area of the relay station 3-1 in a timing and channel which indicates same timing and channel as measuring timing and measuring channel is recognized by the MAP information analyzing unit 36 with the MAP data transmitted from the base station 2. The relay station 3-1 receives a signal (signal including a known signal such as a pilot signal or the like), to be transmitted in such timing and channel, via the MMR 1 link. Since such signal is transmitted in the corresponding timing and channel, radio signals can be transmitted from the relay station 3-1 in the period where reception quality is measured in the radio terminal 4-1.

Accordingly, the measurement control data or the MAP data can be said as playing a role to notify to the radio terminal 4 a period in which the radio terminal 4 can receive radio signals from the relay station 3-1 and can measure the reception quality of the receiving radio signals.

The radio terminal 4-1 transfers the measured reception quality to the control data generating unit 60 and transmits the data in the transmission timing and channel designated by the MAP data (or measurement control data).

The radio base station 2 acquires the measured reception quality information (reception quality 2) directly or via the relay station 3-1 and transfers the information to the communication route determining unit 17.

Moreover, the relay station 3-1 reports the reception quality (reception quality 3) of the radio signal received from the radio base station 2 in separation or together with the reception quality information from the radio terminal 4-1 to the radio base station 2 via the MRR 1. As the measuring object, the preamble may be used and signals received as data to be transmitted to the radio terminal 4-1 within the measuring period via the MMR 1 from the radio base station 2 may also be used. Here, it is also allowed that measurement of reception quality with respect to the radio base station 2 in the relay station 3-1 is conducted periodically individually (using the reception quality measuring unit 41 of FIG. 3) and result of measurement is also periodically reported to the radio base station 2 via the MMR 1. This report can be used in common for adaptive modulation control in the MMR and adaptive control for changing a coding rate. For example, it is possible to use CQI indicating reception quality from the radio base station 2 in the relay station 3 to be transmitted to the radio base station 2 from the relay station 3. CQI changes corresponding to CINR.

The communication route determining unit 17 of the radio base station 2 compares the received two kinds of reception quality information pieces (quality of direct received signal from the radio base station 2 and quality of received signal via the relay station 3) and selects the route of more excellent quality. In this case, as the quality, a radio quality evaluation parameter such as CINR or the like may be used. The communication route determining unit 17 notifies result of selection to the communication route management unit 18 corresponding to the radio terminal 4-1 for the purpose of management and registration.

For the comparison, the reception qualities 1 and 2 are compared with each other and the reception quality 1 can also be compared with a simple average value of the reception qualities 2 and 3. In any case, it is enough when more excellent reception quality is selected.

In addition, the communication route determining unit 17 can use band application efficiency as the reference of comparison. For example, when QPSK is applied for direct communication between the radio base station 2 and the radio terminal 4 and the coding rate is ½, efficiency thereof is evaluated as 1 bit/symbol. Meanwhile, when the 64QAM is applied to the communication between the radio base station 2 and the relay station 3-1 and the coding rate is ½, while the 64QAM is applied to the communication between the relay station 3-1 and the radio terminal 4 and the coding rate is ½, the efficiency of 3 bit/symbol can be obtained in each link. However, since twice transmissions are required for transmission of the same data, the substantial efficiency is evaluated as 1.5 (3/2) bit/symbol. Therefore, it is determined that higher efficiency can be obtained from the route via the relay station and the route via the relay station 3-1 can be selected.

Similarly, in the case where the 64QAM is applied to the communication between the radio base station 2 and the relay station 3 and the coding rate is ½, and the 16QAM is applied between the relay station 3 and radio terminal 4 and the coding rate is ½, the efficiency of 3 bit/symbol and 2 bit/symbol can be obtained in each link. Therefore, the final efficiency of 1.2 (6/(2+3)) bit/symbol can be evaluated when twice transmissions are considered, and it is considered more efficient to employ the route via a relay station. As a result, the route via the relay station is selected.

Figure 6:
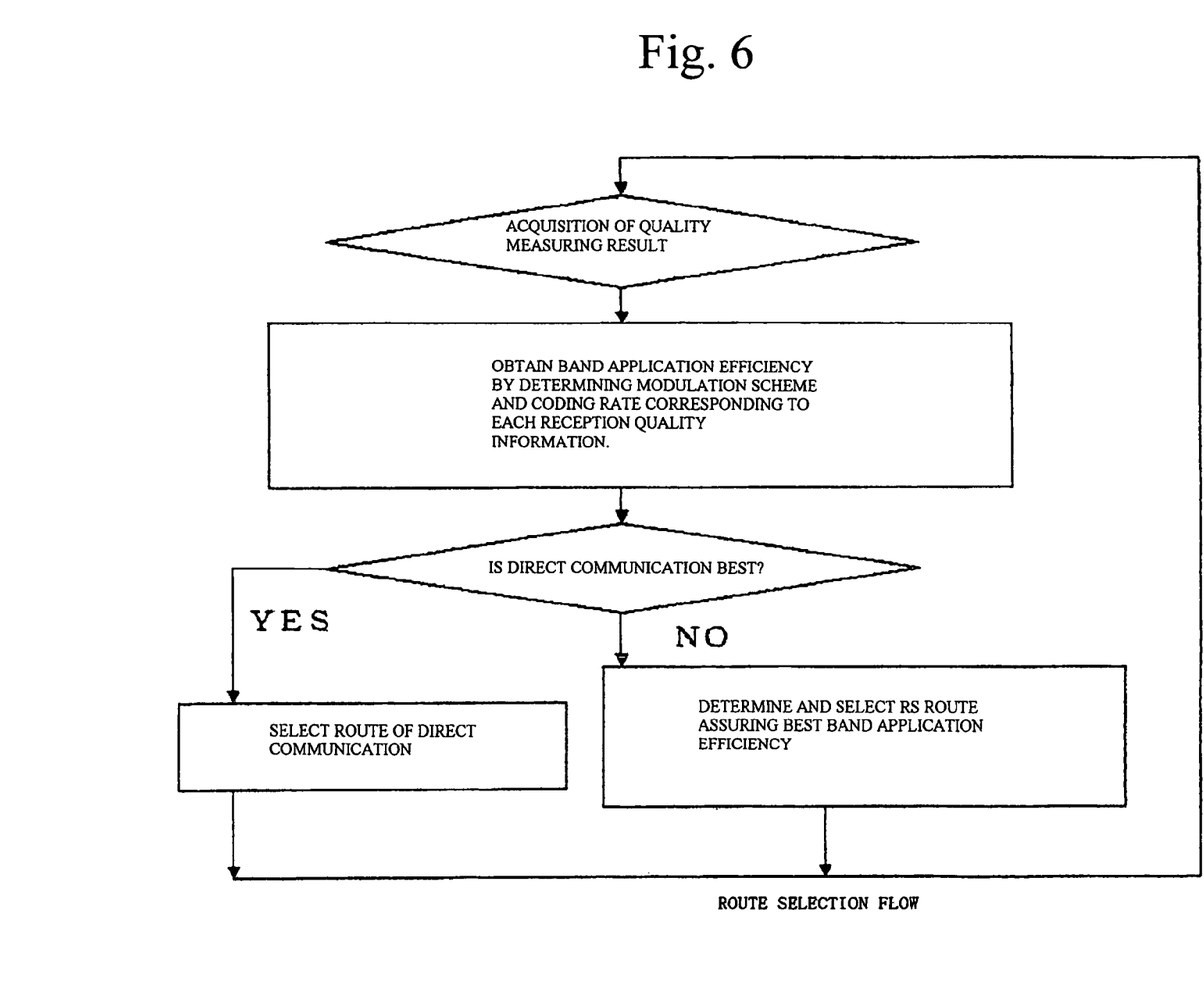
FIG. 6 is an exemplary illustration of a route selection flow.

FIG. 6 is a flowchart for explaining a selection algorithm.

As shown in the figure, at first the radio base station 2 receives quality measurement results from the radio terminal 4. In this case, it is assumed that reception quality of the direct communication at least between the radio base station 2 and the radio terminal 4 and the communication via the relay stations 3-1, 3-2 has been received.

Next, the radio base station obtains the transmitting method (enabling use of adaptive modulation control (change of modulation scheme or the like) and transmission of radio signal by changing the coding rate) by referring a table stored in the communication route determining unit 17, also obtain the band application efficiency explained previously, and thereby determine whether the route assuring highest application efficiency is the direct communication or not. When, result is YES, the radio base station 2 determines the direct communication with the relay station 3 as the best communication and selects the route for such direct communication.

Meanwhile, when result is NO, the route via the relay station ensuring the best application efficiency is determined and such route is selected.

It is also possible to select the route assuring the QOS under the condition whether congestion and QOS are assured or not.

Moreover, it is also possible to consider a transmitting power as an evaluation method.

Namely, in some cases the transmitting powers from the radio base station 2 and relay station 3 are respectively different, but it is desirable, in this case, to consider the transmitting powers.

For example, the best route can also be selected through comparison by defining the normalized reception quality (Mi-NidB) obtained by subtracting each transmitting power (NidB) from each reception quality (MidB) obtained as the reception quality.

In this case, it is also possible to add the transmitting power in order to eliminate-difference between the transmitting power of the relay station or radio base station for the best reception quality among those acquired and the transmitting power of the selected relay station or radio base station.

The selected communication route is administrated and stored in the communication route management unit 18. When the radio base station 2 thereafter transmits radio signals to the radio terminal 4-1, it refers to such selected communication route and conducts the control so that the data is transmitted via the route stored. That is, when the radio base station 2 executes direct transmission, it is not required to transmit transmitting data, addressed to the radio terminal 4-1, to the relay station by using the MMR link and it can transmit directly the data in the timing and channel designated by the MAP data. In the case where transmission is conducted via the relay station 3, the radio base station 2 designates a reception timing and channel by the MAP data and transmits the object data to be transmitted in the timing and channel by using the MMR link to the relay station 3 for transmission to the radio terminal 4-1 from the relay station 3.

The communication route can also be determined by providing the communication route determining unit 17 within the radio terminal 4. In this case, determination result is transmitted as the control data to the communication route management unit 18 of the radio base station 2.

[b] Second Embodiment

In the first embodiment, reception quality is measured in the radio terminal 4 or the like, however, such reception quality is measured in the radio base station 2, relay station 3 or the like in this second embodiment.

In this second embodiment, attention is paid to BS2-1, RS3-1, T4-1, and T4-3 in FIG. 1.

Structure of each device is almost same as that in FIG. 2 to FIG. 4.

Here, the reception quality measuring unit 28 for measuring reception quality in FIG. 2 showing a structure of the radio base station 2, reception quality measuring unit 41 for measuring reception quality in FIG. 3 showing a structure of the relay station 3, control data generating unit 42 for generating the control data including the measured reception quality and transferring such control data to the transmitting system for transmission to the radio base station 2, and measuring signal generating unit 65 for generating the measuring signal (for example, the ranging signal) required for measuring reception quality in the radio base station 2 and relay station 3 and for transferring such signal to the transmitting system are added.

Meanwhile, the measurement instruction analyzing unit 56, reception quality measuring unit 59, and control data generating unit 60 may be deleted in FIG. 4 showing the radio terminal.

Next, a radio frame format used for radio communication among the BS2, RS3-1, T4-1, and T4-3 will be explained with reference to FIG. 7.

Tx and Rx respectively indicate transmission and reception. P denotes preamble, DL/UL MAP denotes MAP data, MMR1 denotes communication period used for communication between BS2 and RS3-1, T4-3 denotes communication period used for direct communication between BS2 and T4-3, and T4-1 denotes communication period for communication between RS3-1 and T4-1.

RNG denotes ranging signal to be transmitted from the radio terminal (T4-1, T4-3). The ranging signal is known signal. This ranging signal is received by the radio base station 2 or relay station 3, deviations of reception timing (phase shift) and receiving frequency and increment/decrement information of necessary transmitting power can be obtained in the receiving system of the receiving device (radio base station or relay station) and such data is reported to the radio base station 2 as the adjustment information. The ranging signal can be generated by the measuring signal generating unit 65.

The radio base station 2 transmits the adjustment information obtained to the radio terminal 4. However, if the management information managed by the communication route management unit 18 indicates that the relay station 3 is included in a route, the radio base station 2 collects adjustment information from the relay station 3. In the case where the relay station 3 is not included in the route, the radio base station 2 execute measurement with respect to the ranging signal the data in the receiving system of the own station and transmits the adjustment information obtained to the radio terminal 4.

RNG can be made periodically after network entry and the period and timing thereof can be instructed by the radio base station 2 with control data transmitted from the radio base station 2.

Meanwhile, CQI means the transmitting period for reporting the result of measurement of reception quality by the radio terminal conducted for the known signal such as preamble or pilot signal or the like and such timing and channel are defined with the UL MAP.

Figure 8:
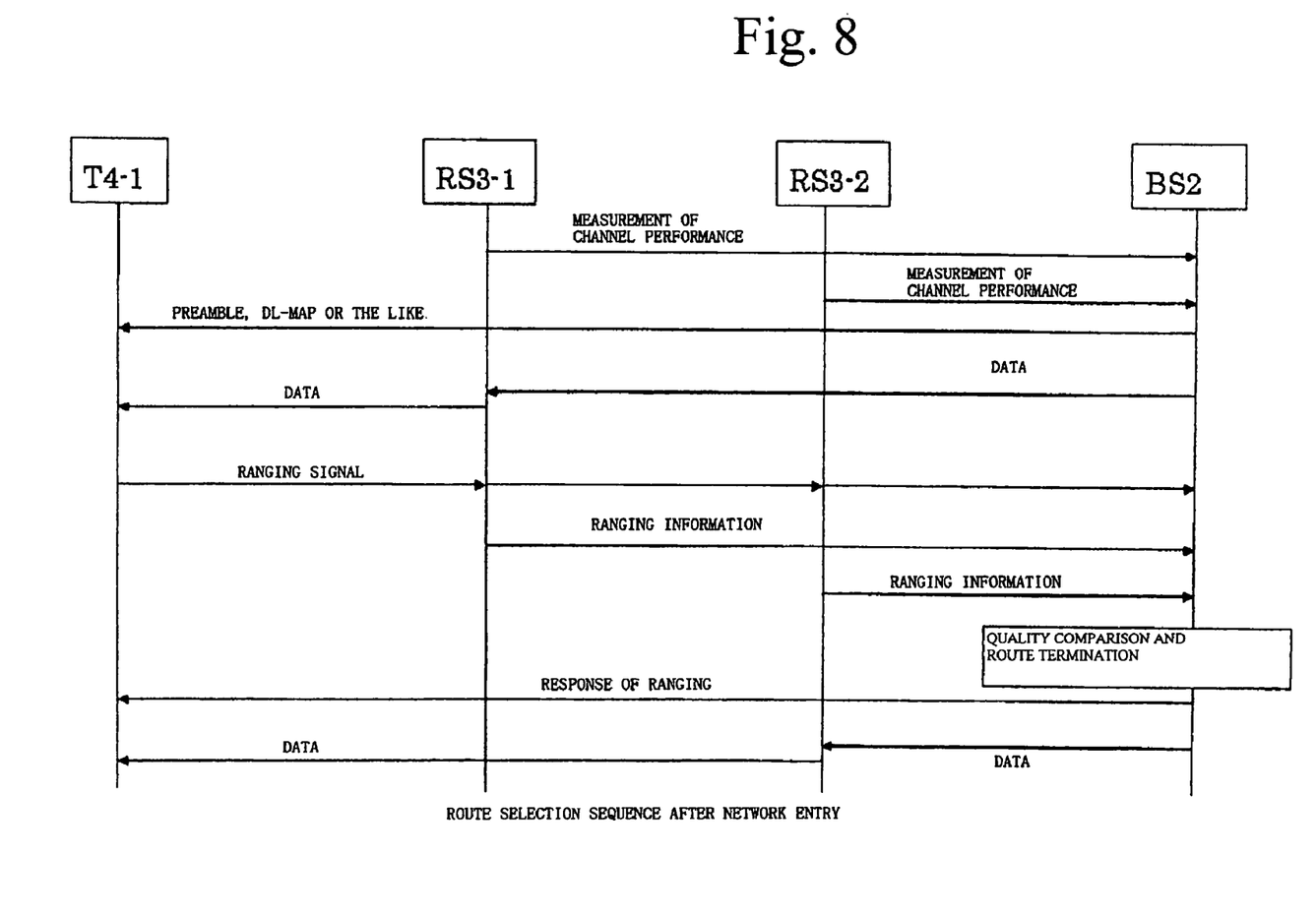
FIG. 8 is an exemplary illustration of a route selection sequence after entry.

Next, route selecting process after network entry will be explained below with reference to FIG. 8. Since entry is already completed, the radio terminal 4 is registered in its existence to the communication route management unit 18 of the radio base station 2.

As shown in the figure, the RS 3-1 and 3-2 periodically transmit channel performance information to the BS2 for management of radio quality between the relay station and radio base station. For example, the relay stations measure reception quality of the known signal such as preamble or the like by the reception quality measuring unit 41 and transmit control data which indicates the measured reception quality to the radio base station wherein the control data is generated by the control data generating unit 42.

The radio base station 2 can adaptively change the modulating scheme and coding rate between the radio base station 2 and the relay station 3 in accordance with the reported channel performance. Namely, the radio base station 2 is capable of acquiring this channel performance information by the control data extracting unit 15 and dynamically changing the coding rate in the coding unit 25 and the modulating scheme in the modulating unit 26 in accordance with the reception quality. The relay station 3 is also capable of controlling transmission by acquiring the channel performance information from the radio base station 2.

Figure 7:
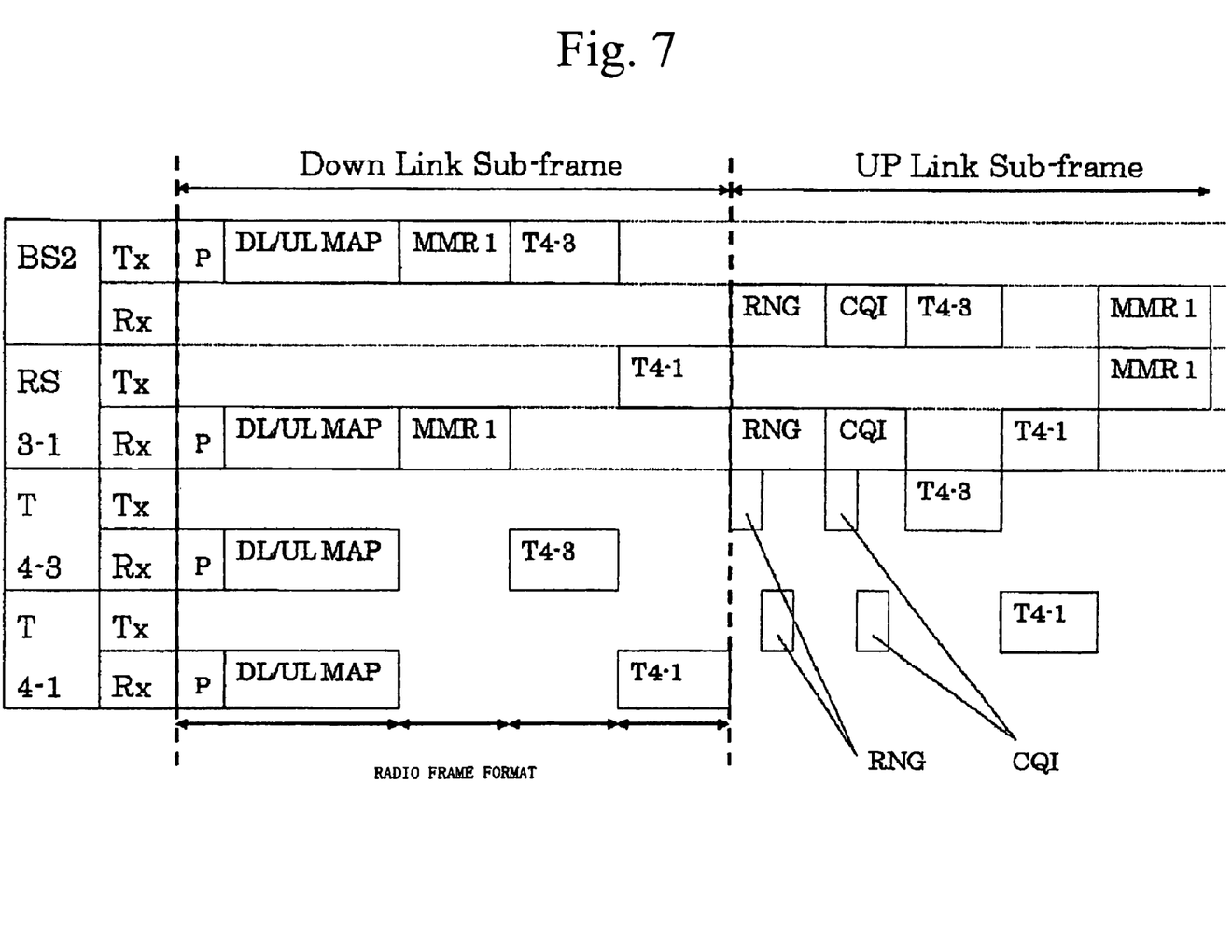
FIG. 7 is an exemplary illustration of a radio frame format.

Here, since the radio terminal T4-1 is making communication with the radio base station 2 via the relay station RS3-1, it receives directly the preamble and UL/DL MAP or the like from the radio base station 2 but also receives the data via the relay station RS3-1 (refer to T4-1 of FIG. 7). Formation of communication route via the relay station RS3-1 is registered to the communication route management unit 18.

On the other hand, the radio terminal 4-1 transmits the ranging signal in the RNG timing and channel designated by the UL MAP data. The ranging signal is generated for transmission in the control data generating unit 60 on the basis of the control of the MAP information analyzing unit 57. Here, when the relay station RS3-2 exists within an area in which the relay station RS3-2 can receive the ranging signal from the radio terminal 4-1, such ranging signal is reached to all of the RS3-1, RS3-2 and BS2 and is received by the receiving units 12, 32.

Accordingly, in this second embodiment, the relay stations RS3-1, R3-2 respectively receive the ranging signal, measures the reception quality by the reception quality measuring unit 41, transfers result of measurement to the control data generating unit 42, and report the result as the ranging information to the BS2 together with the ID of the radio terminal 4-1. In this case, deviation of reception timing (phase shift) deviation of receiving frequency and increment/decrement of necessary transmitting power are obtained in the receiving system and the control data generating unit 42 generates and reports the adjustment information including these contents.

Accordingly, the communication route determining unit 17 of the BS2 compares reception quality of the ranging signal measured by the reception quality measuring unit 28 with the reception quality included in the ranging signal acquired from the relay stations RS3-1, RS3-2 to determined the best route and administrates and registers the route to the communication route management unit 18. For determination of route, various route determining methods explained in the first embodiment may be employed.

The radio base station 2 is capable of measuring the reception quality of the MMR1, 2 as the communication links by the reception quality measuring unit 28 and is capable of considering reception quality to the route extended via the relay stations RS3-1, 3-2. That is, as in the case of the first embodiment, it is possible that a simple average of the reception quality of the uplink to the relay stations RS3-1 and RS3-2 from the radio terminal 4-1 and the reception quality of the uplink to the radio base station 2 from the relay stations RS3-1, RS3-2 is obtained and this simple average is compared with the reception of direct communication in the uplink to the radio base station 2 from the radio terminal 4. As explained previously, the best band efficiency used can also be obtained by arithmetic operations.

When the relay station (here, RS3-2) is provided in the best route, the subsequent transmission control is executed to transmit the data to the radio terminal 4 from such relay station 3-2.

Namely, the MAP information generating unit 23 notifies the transmission timing and channel to the radio terminal 4 and relay station 3-2 by the MAP data and also transmits data, to be transmitted in such timing, to the relay station 3-2 via the MMR2 link. Therefore, the data can be transmitted to the radio terminal 4 via the relay station 3-2.

Moreover, the control data generating unit 19 transmits the adjustment information to the radio terminal 4 as the response to the ranging request. In this case, the adjustment information is employed as the adjustment information acquired from the relay station 3-2 provided in the route selected by the communication route determining unit 17. This adjustment information can be transmitted directly to the radio terminal 4-1 from the radio base station 2, from the radio base station 2 via a relay station 3 which was included in the route before changing the route or from the radio base station 2 via the relay station 3-2 provided in the route which is newly selected this time.

Until the present route is switched to the next route, the data is transmitted to the radio terminal via the relay station 3-2.

Figure 9:
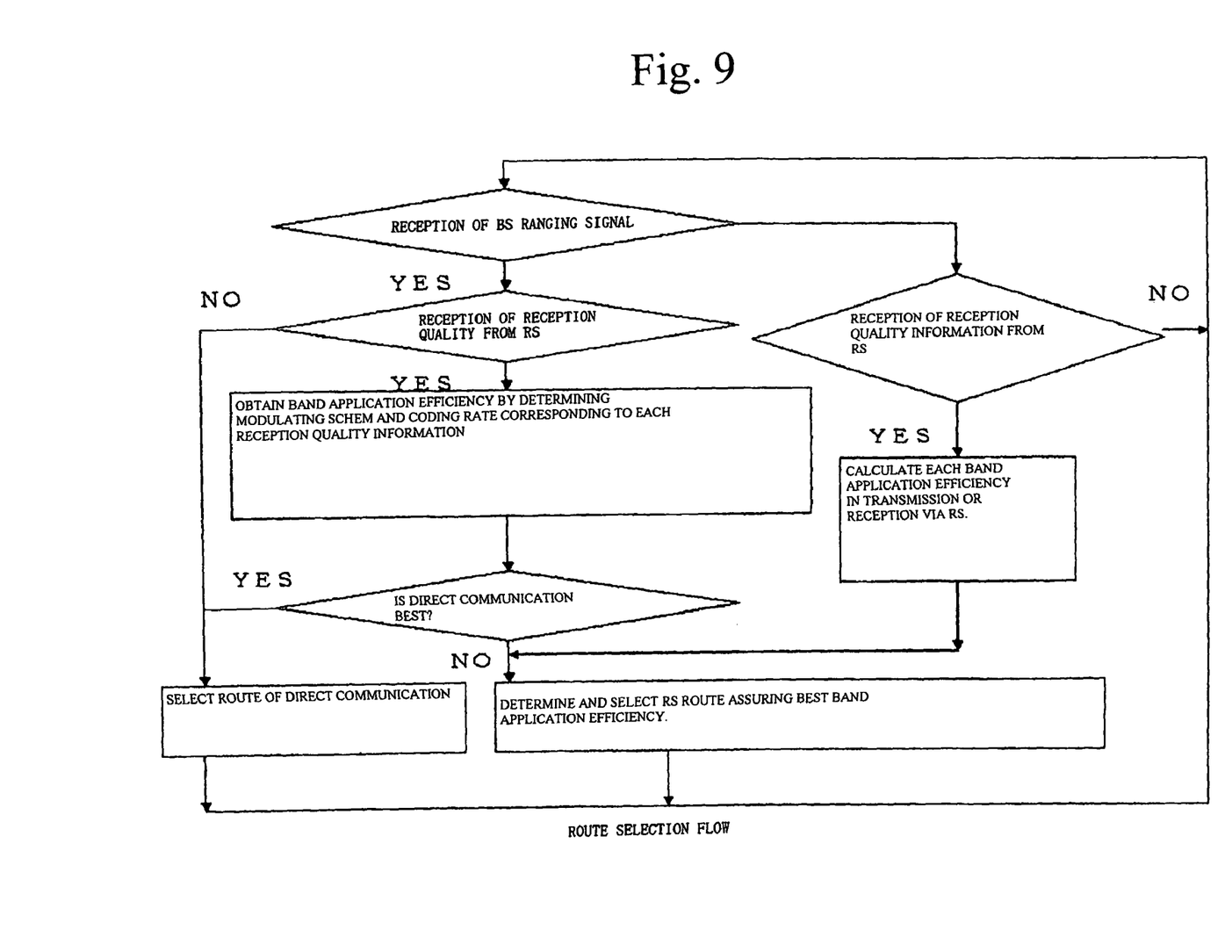
FIG. 9 is an exemplary illustration of a route selection flow.

FIG. 9 shows a route selection flow.

First, the radio base station 2 determines whether the ranging signal has been received or not.

When the ranging signal has been received, it is determined whether reception quality has been received or not from the relay station 3.

If the ranging signal is not yet received, the communication route is selected directly, upon determination that the route cannot be selected via the relay station 3.

When the ranging signal is received, band application efficiency is obtained for each route by respectively determining the modulating scheme and coding rate corresponding to each reception quality information.

Whether the direct communication route is the best route or not is determined on the basis of the band application efficiency information obtained and when the direct communication route is determined as the best route, this direct communication route is selected.

Meanwhile, when it is determined that the direct communication route is not the best route, the relay station 3 provided in the route assuring the best band application efficiency is determined and selected.

In the case where the radio base station does not receive the ranging signal in the first step, it is determined whether the reception quality information has been received from the relay station.

When no reception is determined, the process returns to the first step and reception of the ranging signal is determined again.

On the other hand, when reception is determined, the band application efficiency of the route via the relay station 3 is calculated, the relay station 3 provided in the route assuring the best band application efficiency is determined in the next step, and thereafter communication with the radio terminal 4 is continued with the route including the relay station until the new relay station is selected and switched.

Each method explained in the first embodiment can also be used for calculation of the band application efficiency.

Route selection after network entry has been explained above and such route selection can also be implemented in the stage of network entry.

Namely, under the condition before network entry after the power switch is turned ON, the radio terminal 4 receives first the preamble signal from the radio base station 2 for frame synchronization. In this case, the preamble signal assuring the highest receiving level can be selected as the radio base station 2 as the object of network entry.

The UL/DL MAP information from the selected radio base station 2 is received with reference to the preamble signal and the transmission timing and channel of the ranging signal can also be acquired. In this stage, since the radio base station 2 does not detect the radio terminal 4, the timing allowed for all radio terminals 4 is provided or the timing allowed for the radio terminal 4 belonging to the predetermined group is provided as the transmission timing of the ranging signal and such timing can be used. It is of course possible that a plurality of channels are prepared, any of the channels is selected by the radio terminal 4 for distribution thereof, and thereby the possibility of collision of data transmission among the radio terminals can be reduced.

When the ranging signal is transmitted, this ranging signal is received by the radio base stations 2 and relay stations 3 provided. In this case, the radio terminal 4 can be discriminated by using the discrimination information of the radio terminal 4 included in the ranging signal.

The radio base station 2 and relay station 3 having received the ranging signal respectively measure reception quality of the ranging signal with the reception quality measuring units 28, 41, generate the adjustment information explained above, and the relay station 3 reports this adjustment information to the radio base station 2, while the radio base station 2 holds such adjustment information.

The communication route determining unit 17 determines, as explained above, the best route and registers the result of determination to the communication route management unit 18 and then notifies the adjustment information obtained from the relay station 3, when it is provided in the best route, to the radio terminal 4 or notifies the adjustment information stored in the radio base station 2 to the radio terminal 4 when the relay station 3 is not provided in the route.

Communication for SBC, PKM, REG, DSx or the like to be conducted after transmission of the ranging signal can be realized using the selected route. The control method explained previously is also employed for the data transmitting route.

Here, SBC is the communication for notifying the information about the capability of radio terminal, while PKM is the communication for authentication, REG is the communication for possibility of application of IPV4 and V6 or the like and DSx is the communication for transport connection, namely the communication for determining application or non application of the ARQ.

It is of course possible to utilize the route selected after the network entry.

The route can be individually selected and set respectively for UL/DL. For example, selection by the first embodiment is employed for DL, while selection by the second embodiment is employed for UL.

It is of course possible to apply the selections by the first embodiment and the second embodiment to both UL and DL.

According to the embodiments described above, a relay station can be used effectively.

According to the embodiments described above, in the case where a relay station is newly employed, route selection control and route changing control between the communication route via a relay station and the direct communication route without via a relaying station without any particular communication with the relay station by controlling a radio terminal to recognize installation of a new relay station.

What is claimed is:

1. A radio base station comprising:
   a transmitting unit transmitting a signal to instruct measurement timing of reception quality to a radio terminal, and
   a determining unit determining whether a radio signal should be transmitted to a radio terminal directly rather than via a relay station or via a relay station based on the reception quality measured by said radio terminal with respect to a radio signal transmitted to said radio terminal from said relay station in said measurement timing.

2. The radio base station of claim 1, wherein the measurement timing of the radio signal transmitted from the relay station is different than a timing of a signal transmitted from the base station.

3. A radio base station comprising:
   a transmitting unit transmitting data to control transmission timing to a radio terminal,
   a quality measuring unit obtaining a first reception quality information by receiving, without via a relay station, a signal transmitted in accordance with said control data from said radio terminal and measuring quality of said received signal,
   a receiving unit obtaining a second reception quality information by receiving reception quality information of said signal from a relay station which receives said signal, and
   a determining unit selecting a communication route of said radio terminal based on said first reception quality information and said second reception quality information.

4. The radio base station according to claim 3 wherein said receiving unit receives deviation of reception timing or receiving frequency detected by reception of said signal by said relay station and said transmitting unit transmits said deviation of reception timing or receiving frequency to said radio terminal.

5. A communication method comprising:
receiving a signal from a radio terminal without via a relay station, measuring receiving quality of said signal, and obtaining a first reception quality information, obtaining a second reception quality information by receiving reception quality information of said signal from a relay station which receives said signal, and selecting a communication route of said radio terminal based on said first reception quality information and said second reception quality information.

\* \* \* \* \*